US006816606B2

(12) United States Patent
Wetzel et al.

(10) Patent No.: US 6,816,606 B2
(45) Date of Patent: Nov. 9, 2004

(54) METHOD FOR MAINTAINING HIGH-QUALITY FOCUS DURING HIGH-THROUGHPUT, MICROSCOPIC DIGITAL MONTAGE IMAGING

(75) Inventors: Arthur W. Wetzel, Murrysville, PA (US); John R. Gilbertson, II, Pittsburgh, PA (US); Jeffrey A. Beckstead, Valencia, PA (US); Patricia A. Feineigle, Pittsburgh, PA (US); Christopher R. Hauser, Pittsburgh, PA (US); Frank A. Palmieri, Jr., Gibsonia, PA (US)

(73) Assignee: InterScope Technologies, Inc., Wexford, PA (US)

(*) Notice: Subject to any disclaimer, the term of this patent is extended or adjusted under 35 U.S.C. 154(b) by 592 days.

(21) Appl. No.: 09/788,666

(22) Filed: Feb. 21, 2001

(65) Prior Publication Data

US 2002/0114497 A1 Aug. 22, 2002

(51) Int. Cl.[7] ............................. G06K 9/00; G06K 9/36
(52) U.S. Cl. ................................... 382/128; 382/284
(58) Field of Search .................................. 382/128, 133, 382/284, 255; 356/125, 4.03, 609, 624, 123; 359/368, 382, 656

(56) References Cited

U.S. PATENT DOCUMENTS

| | | | |
|---|---|---|---|
| 3,999,047 A | 12/1976 | Green ....................... 235/151.3 |
| 4,150,360 A | 4/1979 | Kopp et al. ............... 340/146.3 |
| 4,199,748 A | 4/1980 | Bacus ....................... 340/146.3 |
| 4,213,036 A | 7/1980 | Kopp et al. .................... 235/92 |
| 4,523,278 A | 6/1985 | Reinhardt et al. ........... 364/413 |
| 4,742,558 A | 5/1988 | Ishibashi et al. ............... 382/56 |
| 4,779,151 A | 10/1988 | Lind et al. ..................... 360/92 |
| 4,965,725 A | 10/1990 | Rutenberg ............... 364/413.1 |
| 5,068,906 A | 11/1991 | Kosaka ......................... 382/48 |
| 5,072,382 A | 12/1991 | Kamentsky ............ 364/413.08 |
| 5,073,857 A | 12/1991 | Peters et al. .............. 364/413.1 |
| 5,099,521 A | 3/1992 | Kosaka .......................... 382/6 |
| 5,107,422 A | 4/1992 | Kamentsky et al. ... 364/413.08 |
| 5,123,056 A | 6/1992 | Wilson .......................... 382/6 |
| 5,143,193 A | 9/1992 | Geraci ........................ 194/212 |
| 5,163,095 A | 11/1992 | Kosaka .......................... 382/6 |
| 5,216,500 A | 6/1993 | Krummey et al. ............ 358/93 |
| 5,216,596 A | 6/1993 | Weinstein .............. 364/413.02 |
| 5,218,645 A | 6/1993 | Bacus ........................... 382/6 |
| 5,252,487 A | 10/1993 | Bacus et al. .................. 436/63 |
| 5,257,182 A | 10/1993 | Luck et al. .............. 364/413.1 |

(List continued on next page.)

OTHER PUBLICATIONS

"An Efficient Method for Automated Segmentation of Histochemically Stained Slides", Gaddipati et al., IEEE–EMBC and CMBEC (1995).

(List continued on next page.)

*Primary Examiner*—Daniel Miriam
*Assistant Examiner*—Shefali Patel
(74) *Attorney, Agent, or Firm*—Mary Jane Boswell

(57) ABSTRACT

Today's technology allows montage images of large areas to be captured, stored and displayed at the resolution limit of the microscope optics. The invention reduces the overall time to capture a microscope slide by reducing the overhead associated with refocusing the optics at each tile location. Using a macroscopic image of the region to be scanned, representative focus positions are selected based on a predefined set of image characteristics. Prior to montage scanning, these focus positions are placed under the microscope optics and a best-focus position determined. A surface is fit to the resulting three-dimensional data. The parameters that define this surface are feed into the scanning control component to allow high-quality focused images to be acquired throughout the scanning process, eliminating the required stop, refocus, acquire image processing steps used in traditional montage imaging systems.

35 Claims, 3 Drawing Sheets

U.S. PATENT DOCUMENTS

| | | | |
|---|---|---|---|
| 5,260,871 A | 11/1993 | Goldberg | 364/413.02 |
| 5,268,966 A | 12/1993 | Kasdan | 382/6 |
| 5,287,272 A | 2/1994 | Rutenberg et al. | 364/413.01 |
| 5,297,034 A | 3/1994 | Weinstein | 364/413.02 |
| 5,313,532 A | 5/1994 | Harvey et al. | 382/15 |
| 5,333,207 A | 7/1994 | Rutenberg | 382/6 |
| 5,363,258 A | 11/1994 | Coles et al. | 360/92 |
| 5,381,224 A * | 1/1995 | Dixon et al. | 356/72 |
| 5,428,690 A | 6/1995 | Bacus et al. | 382/128 |
| 5,471,561 A | 11/1995 | Cowgill et al. | 395/82 |
| 5,473,706 A | 12/1995 | Bacus et al. | 382/133 |
| 5,499,097 A | 3/1996 | Ortyn et al. | 356/372 |
| 5,505,946 A | 4/1996 | Kennedy et al. | 424/195.1 |
| 5,544,650 A | 8/1996 | Boon et al. | 128/632 |
| 5,544,996 A | 8/1996 | Castaldi et al. | 414/280 |
| 5,625,765 A | 4/1997 | Ellenby et al. | 395/135 |
| 5,636,425 A | 6/1997 | Best | 29/407.04 |
| 5,647,025 A | 7/1997 | Frost et al. | |
| 5,680,694 A | 10/1997 | Best | 29/701 |
| 5,687,251 A | 11/1997 | Erler et al. | 382/133 |
| 5,700,125 A | 12/1997 | Falace et al. | 414/276 |
| 5,768,125 A | 6/1998 | Zinger et al. | 364/167.01 |
| 5,784,162 A | 7/1998 | Cabib et al. | 356/346 |
| 5,796,861 A | 8/1998 | Vogt et al. | 382/128 |
| 5,835,620 A | 11/1998 | Kaplan et al. | 382/133 |
| 5,838,837 A | 11/1998 | Hirosawa et al. | 382/284 |
| 5,848,177 A | 12/1998 | Bauer et al. | 382/128 |
| 5,878,152 A * | 3/1999 | Sussman | 382/106 |
| 5,933,519 A | 8/1999 | Lee et al. | 382/133 |
| 6,014,451 A * | 1/2000 | Berry et al. | 382/110 |
| 6,031,930 A | 2/2000 | Bacus et al. | 382/133 |
| 6,081,612 A | 6/2000 | Gutkowicz-Krusin et al. | 382/128 |
| 6,101,265 A | 8/2000 | Bacus et al. | 382/133 |
| 6,226,392 B1 * | 5/2001 | Bacus et al. | 382/128 |
| 6,545,265 B1 * | 4/2003 | Czarnetzki et al. | 250/234 |

OTHER PUBLICATIONS

"Automatic Threshold Selection Using Histogram Quantization", Wang et al., Journal of BioMedical Optics, vol. 2, No. 2 (Apr. 1997).

"FSED–Feature Selective Edge Detection", Borga et al. (2000).

*Illumea Product Group Internet Page* <http://www.illumea.com/800–823–3203/products/>.

"Biomarkers of Premalignant Breast Disease and Their Use as Surrogate Endpoints in Clinical Trials of Chemopreventive Agents", Boone et al., The Breast Journal, vol. 1, No. 4 (1995).

"Development of Breast Cancer Chemopreventive Drugs", Kelloff et al., Journal of Cellular Biochemistry, 17G:2–13 (1993).

"Development of Surrogate Endpoint Biomarkers for Clinical Trials of Cancer Chemopreventive Agents: Relationships to Fundamental Properties of Preinvasive (Intraepithelial) Neoplasia", Boone et al., Journal of Cellular Biochemistry, Supplement 19:10–22 (1994).

"Markovian Analysis of Cervical Cell Images", Norman J. Pressman, The Journal of Histochemistry and Cytochemistry, vol. 24., No. 1, pp. 138–144 (1976).

"Quantiation of Preinvasive Neoplastic Progression in Animal Models of Chemical Carcinogenesis", Bacus et al., Journal of Cellular Biochemistry Supplements 28/29:21–38 (1997).

"Analytical and Quantitative Cycology and Hiscology", Chromatin Texture Measurement by Markovian Analysis, Dawson et al.

"The Image Processing Handbook", John C. Russ—2nd ed.

"Segmentation of Mammograms Using Multiple Linked Self-Organizing Neural Networks", Dance et al., Med. Phys. 22(2) (Feb. 1995).

"Hough Spectrum and Geometric Texture Feature Analysis", Zhang et al.

"Cervical Cell Recognition and Morphometric Grading by Image Analysis", James W. Bacus, Journal of Cellular Biochemistry, Supplement 23:33–42 (1995).

"Detection and Characterization of Microcalcifications in Mammographic Images", Pereira et al.

* cited by examiner

Representative focus position from Figure 2

| x-position | y-position | z-position | error from fit |
|---|---|---|---|
| -560176 | -242615 | 7780 | 0.71 |
| -509376 | -234148 | 7660 | 13.43 |
| -577109 | -205362 | 7430 | -100.53 |
| -522076 | -203668 | 7390 | -51.43 |
| -577109 | -188428 | 7400 | -6.72 |
| -539009 | -173189 | 7250 | 7.79 |
| -562293 | -220602 | 7640 | 18.70 |
| -547476 | -220602 | 7610 | 9.35 |
| -510000 | -220000 | 7570 | 26.00 |
| -540000 | -200000 | 7430 | -9.60 |
| -535000 | -230000 | 7710 | 58.04 |
| -558059 | -205362 | 7460 | -43.97 |
| -507259 | -205362 | 7340 | -93.16 |
| -572876 | -178268 | 7400 | 73.45 |
| -545359 | -171495 | 7280 | 41.32 |
| -524193 | -218908 | 7610 | 54.19 |

Best fit is planar with parameters:
$dz/dx = -0.00139400 \quad dz/dy = -0.00731100 \quad z0 = 5224.64$

Figure 3

METHOD FOR MAINTAINING HIGH-QUALITY FOCUS DURING HIGH-THROUGHPUT, MICROSCOPIC DIGITAL MONTAGE IMAGING

FIELD OF THE INVENTION

The present invention relates to microscopic digital imaging of complete tissue sections for medical and research use. In particular it describes a method for maintaining high quality focus during high throughput montage imaging of microscope slides.

BACKGROUND OF THE INVENTION

Laboratories in many biomedical specialties, such as anatomic pathology, hematology, and microbiology, examine tissue under a microscope for the presence and the nature of disease. In recent years, these laboratories have shown a growing interest in microscopic digital imaging as an adjunct to direct visual examination. Digital imaging has a number of advantages including the ability to document disease, share findings, collaborate (as in telemedicine), and analyze morphologic findings by computer. Though numerous studies have shown that digital image quality is acceptable for most clinical and research use, some aspects of microscopic digital imaging are limited in application. Perhaps the most important limitation to microscopic digital imaging is a "sub-sampling" problem encountered in all single frame images. The sub-sampling problem has two components: a field of view problem and a resolution-based problem. The field of view problem occurs when an investigator looking at a single frame cannot determine what lies outside the view of an image on a slide. The resolution-based problem occurs when the investigator looking at an image is limited to the resolution of the image. The investigator cannot "zoom in" for a closer examination or "zoom out" for a bird's eye view. Significantly, the field of view and resolution-based problems are inversely related. Thus, as one increases magnification to improve resolution, one decreases the field of view.

To get around the limitation of single frame imaging, several neighboring images can be tiled together to form a montage image or "virtual slide". To accomplish this, a robotic microscope systematically scans the entire slide, taking an image at every field. The individual images are then "knitted" together in a software application to form a very large data set with very appealing properties. The robotic microscope can span the entire slide area at a resolution limited only by the power of the optical system and camera. Software exists to display this data set at any resolution on a computer screen, allowing the user to zoom in, zoom out, and pan around the data set as if using a physical microscope. The data set can be stored for documentation, shared over the Internet, or analyzed by computer programs.

The "virtual slide" option has some limitations, however. One of the limitations is file size. For an average tissue section, the data generated at 0.33 um/pixel can be between two and five gigabytes uncompressed. In an extreme case, the data generated from one slide can be up to thirty-six gigabytes.

A much more difficult limitation with the prior systems is an image capture time problem. Given an optical primary magnification of twenty and a two-third inch CCD, the system field of view is approximately (8.8 mm×6.6 mm)/20=0.44×0.33 mm. A standard tissue section of approximately 2.25 square centimeters, therefore, requires approximately fifteen hundred fields to cover the tissue alone.

Field rate in montage systems is limited by three factors—camera frame rate, image processing speed, and the rate of slide motion between fields. Given today's technology, the rate of slide motion is a significant limiting factor largely because the existing imaging systems require the slide to come to a stop at the center of each field to capture a blur free image of the field.

The three dimensional characteristic of the tissue sample and the slide places additional limitations on the imaging system. Like all lenses, microscope optics have a finite depth of field, the distance within which objects will appear to be focused. A typical depth of field is about 8 microns for a 10×objective, and in general, as the magnification increases, the depth of field decreases. While microscope slides are polished glass, the flatness of the slide can vary on the order of 50 microns or more across the slide. The variations in the tissue sample thickness and any defects associated with placing the sample on the slide such as folds in the tissue, also affect the optimal position of the slide with respect to the imaging optics. The magnitude of the optimal position and the limited depth of field of the microscope optics require the focus to be adjusted as the system moves from field to field. In order to determine the optimal focal position, multiple images must be acquired as the slide is displaced along the optical axis (perpendicular to the scanning plane) and a quantitative value such as contrast calculated for each image. The direction and the amount of displacement required to maintain high-quality focus is dependent on the three dimensional structure of the slide and tissue specimen. Given that the average tissue section mentioned above requires fifteen hundred image fields, the time required to refocus at each tile can contribute substantially to the overall scan time.

Thus, a system is needed to reduce the overhead associated with refocusing while maintaining efficiency and image quality. This invention relates to maintaining high-quality focus as it is scanned without having to rely on refocusing during the scanning process.

SUMMARY OF THE INVENTION

Accordingly the invention relates to a method and system for ensuring that a scanning process captures a high-quality montage image of a slide by enabling accurate focus control of raw image tiles of the slide. The system includes a focus point selection component, a focal surface determination component, and a scan control component. The focus point selection component evaluates tissue regions of a thumbnail image and selects several points to initially focus microscope optics on a point-by-point basis. The focal surface determination component uses focus positions to generate a three-dimensional data set corresponding to optical specimen distance at each stage location, wherein data points in the data set are used as input to a routine that generates control parameters for a slide scanning process. The scan control component captures the high-quality montage image by maintaining motion of a stage and synchronization of a microscopic imaging system during montage image acquisition. The scan control component thus, enables accurate focus control of optical elements without requiring stopping and refocusing of the stage at each tile location and substantially reduces montage acquisition time. The system also includes means for placing focus positions from the focus point selection component into microscope optics in the focal surface determination component and for passing tissue information and surface parameters to the scan control component.

It is therefore an object of the invention to provide an automated, microscopic imaging system for whole slide montage in which standard microscope optics, an off-the-shelf camera and a simple motorized stage can be used to produce perfectly aligned, well-focused image tiles, and acquire these images at a speed limited by the camera frame rate. The present invention uses the fact that the scale length associated with the three dimensional nature of the slide and tissue specimen is large compared to the field of view of a single camera image. By pre-sampling key regions on the slide, a focal surface can be calculated, control parameters generated based on this surface, and the optimal stage position with respect to the optical elements maintained throughout the scanning process, insuring high-quality images with minimal overhead.

Additional features and advantages of the invention will be set forth in the description that follows, and in part will be apparent from the description, or may be learned by practice of the invention. The objectives and advantages of the invention to be realized and attained by the microscopic image capture system will be pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

FIG. 3 illustrates a generated three-dimensional data set.

DESCRIPTION OF THE PREFERRED EMBODIMENTS

Reference will now be made in detail to the preferred embodiments of the present invention, an example of which is illustrated in the accompanying drawing. The following paragraphs describe the functionality of the inventive system and method for focus controlled, high throughput montage imaging of microscope slides using a standard microscope, camera, and a motorized mechanical stage.

Figure 1:
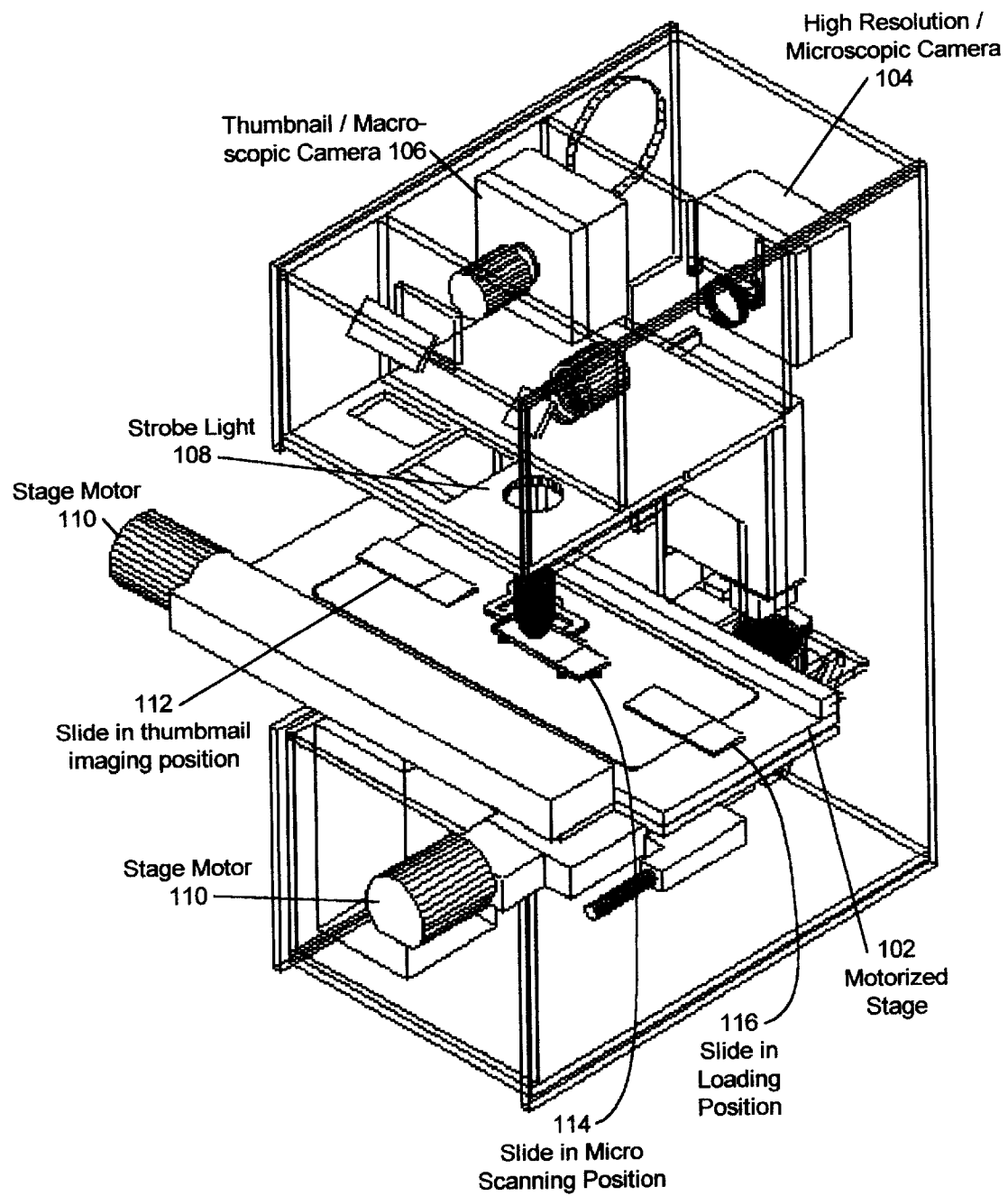
FIG. 1 illustrates a side view of the system in a preferred embodiment.

FIG. 1 illustrates a preferred embodiment of the invention. In this embodiment, a slide 112, 114, and 116 to be imaged is placed in a slide holder on a motorized stage 102. A low-resolution image obtained from the macroscopic camera 106 is processed to determine tissue locations on the slide 112, 114, and 116. As is obvious to one skilled in the art, a single image or multiple low-resolution images can also be acquired through the microscopic optics 104 with the proper objectives. All of which can be processed to determine tissue locations on the slide 112, 114, and 116.

The tissue locations can then be used to generate control parameters for the stage 102 and microscopic camera 104 to insure that the scanning process captures high quality images of only the tissue regions. Specifically in a preferred embodiment, a pre-scan processing of the tissue locations includes a focus point selection component, a focal surface determination component and a scan control component. The first two components ensure that the last component captures a high-quality montage image, by enabling accurate focus control of the optical elements without requiring the stage 102 to be stopped and refocused at each tile location, substantially reducing the acquisition time.

To achieve good focus for an entire slide 112, 114, and 116, the surface that best represents the focal position of the sample with respect to the optical elements is determined and used to automatically control the focus as the tissue is scanned under the microscope optics 104.

In the preferred embodiment, the focus point selection component evaluates the tissue regions of the thumbnail image and selects several points to initially focus the microscope optics 104 on a point-by-point basis. These positions are selected based on their relative contrast within the thumbnail image, or an alternative selection criteria, and their overall distribution of points with respect to the tissue coverage area.

In alternative embodiments, the focus points are either user definable through an input file or through a suitable user interface. In addition, for cases where the specimen locations are reproducible on the slides 112, 114, and 116, the focus points can be predefined and repeated for each slide 112, 114, and 116 without the use of a macroscopic image or any preprocessing to find the tissue regions.

Once selected, each focus position is placed under the microscope optics 104 in the focal surface determination component, and an auto-focus program determines the best-fit focus at each position. This generates a three-dimensional data set corresponding to the optimal specimen distance at each stage location. These data points are used as input to a surface fitting routine that generates the necessary control parameters of the slide scanning process. The number of data points required will depend on the actual three-dimensional structure defined by the specimen and slide, and the geometrical dimension of the surface to be fit. Once the surface has been determined, an error function can be calculated to determine the fit accuracy. If the accuracy exceeds expected limits, additional points can be acquired and the surface recalculated.

At the completion, the tissue information and the surface parameters are passed to the scan control component. This component is responsible for the motion of the stage and synchronization of the microscopic imaging system during montage image acquisition. To achieve accurate, well-aligned tiled images, the specimen must be positioned such that each camera image is aligned within the equivalent single pixel spacing in real or stage space (camera pixel size divided by the overall optical magnification). This usually entails a stage step of $\delta x$ and $\delta y$ where each step is directly related to the effective pixel size and the number of image pixels in the x and y directions respectively. For example, a 1300×1030 pixel, 10 $\mu$m square pixel camera operated at 20× magnification results in $\delta x=10$ $\mu$m*1300/20=650 $\mu$m and $\delta y=515$ $\mu$m. To maintain focus during the scanning process, the stage must be positioned at the proper focal position as determined by the focus surface parameters: $Z_{ij}=f(x_i, y_j)$ where $$x_i=x_o+i*\delta x \text{ and } y_j=y_o+i*\delta y.$$

Image montage scanning is traditionally accomplished by either scanning by rows or columns. Assuming that tiling is completed by scanning across a row and stepping in the y-direction, if the scanning process is completed by stepping in the row or x-direction, the stage 102 is simply positioned at the appropriates position given by $z_{ij}=f(x_i, y_j)$. Thereafter, the stage is stopped and an image is acquired. If imaging is accomplished during continuous motion of the stage in the x-direction via a line scan camera or alternative imaging arrangement, the vertical velocity as a function of $x_j$ and subsequently of time, can be computed from the derivative of the focal surface. This velocity can be used to control the optical position and maintain focus as images are acquired continuously across the row. Depending on the surface, a new velocity function may be required for each row scanned based on the stepped y-position.

Figure 2:
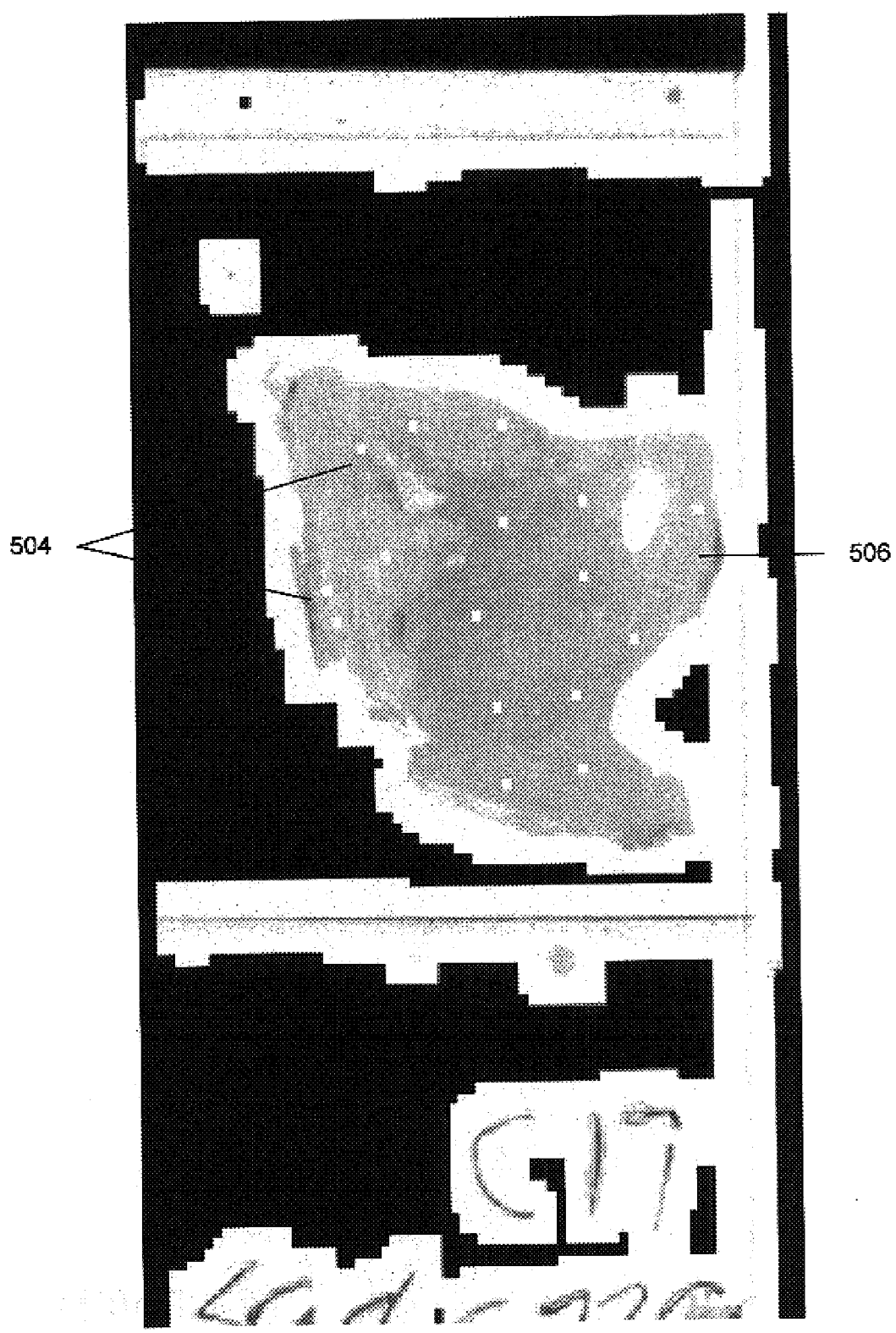
FIG. 2 illustrates the results of the focus point selection component on a sample image.

FIG. 2 represents the results of the focus point selection component. This figure shows the thumbnail or macroscopic image 506 of the region to be scanned. The light spots 504 overlaid on the figure represent the positions selected by the focus point selection component. These positions are placed under the microscope and auto-focused on each location. FIG. 3 illustrates the three-dimensional date set generated from FIG. 2. For this slide, the best fit was planar ($z(x,y)=dz/dx\ x+dz/dy\ y\ t\ z0$) with the parameters shown in FIG. 3.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A method for ensuring that an image acquisition process captures a high-quality image of a specimen by enabling accurate focus control of image tiles of the specimen, the method comprising:

evaluating regions of a thumbnail image of the specimen;

selecting a plurality of specimen position from the thumbnail image on which to focus microscope optics based on at least one of the relative contrast within the thumbnail image and the distribution of positions with respect to the specimen;

placing under the microscope optics the specimen positions, wherein a best-fit focus at each specimen position is determined;

generating a three-dimensional data set corresponding to an optimal specimen distance at the specimen positions, wherein data points in the data set are used as inputs to a routine that generates control parameters for the image acquisition process; and passing the control parameters to a component that is responsible for moving a stage and synchronizing a microscopic imaging system during image acquisition.

2. The method of claim 1, further comprising determining a focal surface that represents a focal position at the selected specimen position and using information from the focal surface to automatically control focus as the image is acquired.

3. The method of claim 2, further comprising positioning the stage at a proper focal position as determined by the focus surface.

4. The method of claim 2, further comprising computing a vertical velocity, as a function of a parameter and subsequently of time, from the derivative of the focal surface if imaging is accomplished during continuous motion of the stage via an imaging arrangement.

5. The method of claim 4, further comprising using the velocity to control the optical position and maintain focus as images are acquired.

6. The method of claim 5, further comprising requiring a new velocity function for each row scanned.

7. The method of claim 1, wherein selecting further comprises allowing a user to define specimen positions through an input file.

8. The method of claim 1, wherein selecting further comprises allowing a user to define focus points through a user interface.

9. The method of claim 1, wherein the number of specimen positions selected depends on a three-dimensional surface defined by the specimen and a geometrical dimension of a surface to be fit.

10. The method of claim 9, further comprising:

calculating the focal surface based on focal positions for the selected specimen positions; and calculating an error function to determine a fit accuracy between the focal surface and the surface defined by the specimen, wherein if the accuracy exceeds an expected limit, at least one additional points can be acquired and the focal surface recalculated.

11. The method of claim 1, further comprising positioning the specimen such that the specimen position within the thumbnail image is aligned with the specimen as positioned under the microscopic optics.

12. The method of claim 1, wherein:

at least two specimen positions are selected from the thumbnail image;

a best-fit focus is determined at each of the at least two specimen positions; and the three-dimensional data set is equivalent to a surface including the best-fit focus for the at least two specimen positions.

13. The method of claim 1, wherein the thumbnail image is a macroscopic image.

14. The method of claim 1, wherein the thumbnail image is an image taken with a macroscopic camera.

15. The method of claim 1, wherein the thumbnail image is an image of the entire specimen.

16. The method of claim 1, wherein the imaging process includes scanning the specimen.

17. The method of claim 1, wherein the specimen includes a tissue sample.

18. A system for ensuring that an image acquisition process captures a high-quality image of the specimen by enabling accurate focus control of image tiles of the specimen, the system comprising:

a focus point selection component that evaluates specimen regions of a thumbnail image and selects a plurality of specimen points from the thumbnail image on which to initially focus microscope optics based on at least one of the relative contrast within the thumbnail image and the distribution of positions with respect to the specimen;

a focal surface determination component that uses a focus positions for each specimen point to generate a three-dimensional data set corresponding to an optical distance at the specimen points, wherein data points in the data set are used as inputs to a routine that generates control parameters for an image acquisition process;

an image acquisition control component that captures the high-quality image by maintaining motion of a stage and synchronization of a microscopic imaging system during image acquisition, thereby enabling accurate focus control of the microscope optics without requiring stopping and refocusing of the stage at each tile location, thereby substantially reducing image acquisition time; and means for placing the focus position from the focus point selection component into the focal surface determination component and for passing the control parameters to the image acquisition control component.

19. The system of claim 18, wherein focus points are definable through an input file.

20. The system of claim 18, wherein focus points are definable through a user interface.

21. The system of claim 18, wherein the focus points are predefined and repeated for a plurality of specimens without any preprocessing to find regions, when specimen locations are reproducible on the plurality of specimens.

22. The system of claim 18, wherein the number of specimen points selected depends on a three-dimensional surface defined by the specimen and a geometrical dimension of a surface to be fit.

23. The system of claim 22, wherein:
the focal surface determination component creates a focal surface defined by a focus distance to each of the selected specimen points; and
once the focal surface is determined, an error function is calculated to determine a fit accuracy between the focal surface and the surface defined by the specimen, wherein if the accuracy exceeds an expected limit, at least one additional point can be acquired and the focal surface is recalculated.

24. The system of claim 18, wherein the tissue is positioned such that the specimen position within the thumbnail image is aligned with the specimen as positioned under the microscopic optics.

25. The system of claim 18, wherein to maintain focus during the scanning process, the stage is positioned at a proper focal position as determined by the focal surface control parameters.

26. The system of claim 18, wherein a vertical velocity is computed, as a function of a parameter and subsequently of time, from the derivative of the focal surface if imaging is accomplished during continuous motion of the stage via an imaging arrangement.

27. The system of claim 26, wherein the velocity is used to control the optical position and maintain focus as images are acquired.

28. The system of claim 27, wherein a new velocity function is required for each row scanned.

29. The system of claim 18, wherein:
the focus point selection component selects at least two specimen points from the thumbnail image;
the focal surface determination component uses focus positions for the at least two specimen points; and
the three-dimensional data set is equivalent to a surface including the focus positions for the at least two specimen positions.

30. The system of claim 18, wherein the thumbnail image is a macroscopic image.

31. The system of claim 18, wherein the thumbnail image is an image taken with a macroscopic camera.

32. The system of claim 18, wherein the thumbnail image is an image of the entire specimen.

33. The system of claim 18, wherein the imaging process includes scanning the specimen.

34. The method of claim 18, wherein the specimen includes a tissue sample.

35. A system for ensuring that a scanning process captures a high-quality image of a specimen by enabling accurate focus control of image tiles of the specimen, the system comprising:
a plurality of first components for evaluating regions of the specimen displayed in a thumbnail image, selecting several specimen points on which to initially focus microscope optics based on at least one of the relative contrast within the thumbnail image and the distribution of positions with respect to the specimen and generating a three-dimensional data set corresponding to optical specimen distance at each specimen point, wherein data points in the data set are used as inputs to a routine that generates control parameters for an image acquisition process;
a second component that captures the high-quality image by maintaining motion of a stage and synchronization of a microscopic imaging system during image acquisition, thereby enabling accurate focus control of optical elements without requiring stopping and refocusing of the stage at each tile location and substantially reducing acquisition time; and
means for passing information between the plurality of first components and for passing information between the plurality of first components and the second component.

* * * * *